(12) United States Patent
Esser

(10) Patent No.: US 8,140,564 B2
(45) Date of Patent: Mar. 20, 2012

(54) GENERATING SEARCH AND SELECT TABLES

(75) Inventor: Patrick Josef Esser, Heidelberg (DE)

(73) Assignee: SAP AG, Walldorf (DE)

( * ) Notice: Subject to any disclaimer, the term of this patent is extended or adjusted under 35 U.S.C. 154(b) by 586 days.

(21) Appl. No.: 12/336,377

(22) Filed: Dec. 16, 2008

(65) Prior Publication Data

US 2010/0153414 A1 Jun. 17, 2010

(51) Int. Cl.
G06F 17/30 (2006.01)
(52) U.S. Cl. .................... 707/769; 707/672
(58) Field of Classification Search .............. 707/706, 707/805, 661, 672, 722, 765, 769; 701/36; 709/206, 223; 715/255, 770, 821, 864
See application file for complete search history.

(56) References Cited

U.S. PATENT DOCUMENTS

| 7,136,854 B2 * | 11/2006 | Smith et al. .................. 1/1 |
| 2002/0065849 A1 * | 5/2002 | Ferguson et al. .............. 707/513 |
| 2004/0003088 A1 * | 1/2004 | Ng et al. ..................... 709/226 |

OTHER PUBLICATIONS

Admitted Prior Art, URL http://help.sap.com/saphelp_nwce711/helpdata/en/47/fc152d6be44aa7e10000000a421937/content.htm.

* cited by examiner

Primary Examiner — Shahid Alam
(74) Attorney, Agent, or Firm — Mintz, Levin, Cohn, Ferris, Glovsky and Popeo, P.C.

(57) ABSTRACT

A graphical user interface including, in a single table, a search pane on a top portion, a results section on a bottom portion, and a selected items section in a middle portion between the top portion and the bottom portion is provided. Thereafter, first user-generated input is received via the search pane in the top portion of the table in the graphical user interface that specifies a first alphanumeric search query. In response, one or more data repositories are polled to obtain results responsive to the first alphanumeric search query. Once the results are obtained, one or more results responsive to the first alphanumeric search query are displayed in the results section. Each result responsive to the first alphanumeric search query is displayed in a respective row in the results section of the table. Each result responsive to the first alphanumeric search query further includes a first graphical user interface element in the corresponding row. Second user-generated input is received that selects one or more of the first graphical user interface elements in the results section. In response to such second user-generated input results corresponding to the selected one or more first graphical user interface elements are moved from the results section to the selected items section of the table such that results that do not correspond to the selected one or more first graphical user interface elements remain displayed in the results section. Related apparatus, systems, techniques and articles are also described.

16 Claims, 4 Drawing Sheets

Search and Select Stock

Find [100-001-20] [Go]

| | Product ID | Product Description | Identified Stock ID | Identified Stock TYPE | Logistics Area ID |
|---|---|---|---|---|---|
| ▼ Selected Items | [Add Row] | [Remove] | [Remove All] | | |
| | MCF3535 | Heater | 456456 | Produktionslos | 100-001-20 |
| ▼ Search Results | [Select All] | | | | |
| | MCF435345 | Burner | 26456 | Produktionslos | 100-001-20 |
| | MCF456436 | Chassis | 5677457 | Produktionslos | 100-001-20 |
| | MCF345345 | Core | 567568356 | Produktionslos | 100-001-20 |
| | MCF435345 | Frame | 43 | Produktionslos | 100-001-20 |
| | MCF435 | Screw | 436346346 | Produktionslos | 100-001-20 |
| | MCF435345 | Motor | 436346346 | Produktionslos | 100-001-20 |
| | MCF46436 | Oven | 4645775 | Produktionslos | 100-001-20 |
| | MCF345345 | Pipe | 4567457457 | Produktionslos | 100-001-20 |
| | MCF768568 | Plate | 56456 | Produktionslos | 100-001-20 |
| | MCF456436 | Panel | 4564577 | Produktionslos | 100-001-20 |

Advanced

| Search and Select Stock | | | | | Advanced |
|---|---|---|---|---|---|
| Find Plate GO | | | | | |
| | Product ID | Product Description | Identified Stock ID | Identified Stock TYPE | Logistics Area ID |
| ▼ Selected Items | Add Row Remove Remove All | | | | |
| MCF3535 | Heater | 456456 | Produktionslos | 100-001-20 | |
| ▼ Search Results | Select All | | | | |
| MCF4164 | Plate | 12345 | Produktionslos | 555-664-20 | |
| MCF4164 | Plate | 12345 | Produktionslos | 435-345-30 | |
| MCF4164 | Plate | 12345 | Produktionslos | 456-100-10 | |

Details: MCF4164 Plate
Details | Notes

Stock Separators
Product: MCF4164 Plate
Identified Stock: 12345
Owner: 111 AKRON Heating Technologies Inc.
Restricted: No
Planning Area: MC64000 AHT Kokomo Organizational Information
Storage Location: MC64050 KK Production

GENERATING SEARCH AND SELECT TABLES

TECHNICAL FIELD

The subject matter described herein relates to techniques, articles, and systems that provide a graphical user interface for selectively aggregating results from multiple queries.

BACKGROUND

There are many instances, particularly in connection with supply chain management, in which a user accesses one or more interfaces in order to initiate queries for items, browse through the results of such queries, and select certain results in order to perform some subsequent action. For example, several bins or storage areas could be selected for physical inventory. Several outbound deliveries can be selected to create a freight list. Several purchase items can be selected to create an inbound delivery or return delivery. Different products can be selected to create a goods issue or receipt. Conventional interfaces for performing such tasks can sometimes be inefficient, especially when results are collected from the results of multiple queries.

SUMMARY

In one aspect, a graphical user interface is provided that includes, in a single table, a search pane on a top portion, a results section on a bottom portion, and a selected items section in a middle portion between the top portion and the bottom portion. First user-generated input can be received, via the search pane in the top portion of the table in the graphical user interface, that specifies a first alphanumeric search query. In response to the first alphanumeric search query, one or more data repositories are polled to obtain results responsive to the first alphanumeric search query. Thereafter, one or more results responsive to the first alphanumeric search query are displayed in the results section. Each result responsive to the first alphanumeric search query is displayed in a respective row in the results section of the table. Each result responsive to the first alphanumeric search query can include a first graphical user interface element in the corresponding row. Second user-generated input is received that selects one or more of the first graphical user interface elements in the results section. In response to the second user-generated input, results corresponding to the selected one or more first graphical user interface elements are moved from the results section to the selected items section of the table such that results that do not correspond to the selected one or more first graphical user interface elements remain displayed in the results section.

User-generated input can be received, via the search pane in the top portion of the table in the graphical user interface, that specifies a second alphanumeric search query. One or more data repositories can then be polled to obtain results responsive to the second alphanumeric search query. Subsequently, one or more results responsive to the second alphanumeric search query are displayed in the results section as well as results from the first alphanumeric search query that do not correspond to the selected one or more first graphical user interface elements. In other variations, only the results from the most recent alphanumeric search query are displayed at any given time in the results section.

Each result responsive to the second alphanumeric search query can be displayed in a respective row in the results section of the table. Each result further responsive to the second alphanumeric search query can include a second graphical user interface element in the corresponding row. Further user generated input can be received that selects one or more of the second graphical user interface elements in the results section so that results corresponding to the selected one or more second graphical user interface elements can be moved from the results section to the middle portion of the table such that results that do not correspond to the selected one or more first graphical user interface elements and that do not correspond to the selected one or more second graphical user interface elements remain displayed in the results section.

The search pane can further include one or more graphical user interface elements for defining parameters of the first alphanumeric search query.

Additional user-generated input identifying an item to be added to the middle portion can be received so that manually entered items can be displayed in the middle portion.

The graphical user interface can be rendered on a client computer system and the one or more data repositories can reside on one or more remote computer systems.

The single table can be a fixed size such that scrollbars are rendered in the graphical user interface when rows in either of the middle portion or the bottom portion cannot be rendered due to size restrictions.

User-generated can be received that selects a graphical user interface element associated with one of the rows which results in additional information characterizing the result with the corresponding selected second graphical user interface element.

Various subsequent actions can be initiated based on results in the middle portion of the selected items section in the middle portion of the table. The subsequent action changes an attribute associated with records for the selected results in the one or more data repositories. For example, required parts to implement a service order can be selected and their availability attribute in the various inventory control system repositories can be changed to reflect that the parts are no longer available.

Results in the middle portion can also have associated graphical user interface elements, which when activated, cause the corresponding results to be moved from the selected items section to the results section.

In some implementations, the size of the selected items section is fixed, while in other implementations, the size of the selected items section varies based on a number of items being displayed within such section. Scrollbars and other graphical user interface controls can be provided when there are more items to display than can fit within a predefined size.

In an interrelated aspect, a graphical user interface is provided that includes a search pane on a top portion, a results section on a bottom portion, and a selected items section in a middle portion between the top portion and the bottom portion. A plurality of alphanumeric search queries can be received via the search pane in the top portion of the table in the graphical user interface. One or more data repositories are polled to obtain results responsive to such alphanumeric search query. Results responsive to a most recent of such queries in the results section (i.e., only results from the last query are displayed). One or more of the graphical user interface elements in the results section, can be selected, via the graphical user interface. In response to such sleeted, results corresponding to the selected one or more graphical user interface elements are moved from the results section to the selected items section of the table. Results from the most recent alphanumeric search query that do not correspond to the selected one or more first graphical user interface elements remain displayed in the results section. In addition, results from an alphanumeric search query prior to the most recently alphanumeric search query are not displayed in the results section. The selected items section can contain results originating from two or more alphanumeric search queries.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. By providing an interface with a single table in which results from one or more queries can be moved into a selected portion, users are able to more rapidly assemble lists of results. Moreover, such an interface is intuitive thereby decreasing an amount of explanation and learning required by novices.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a diagram illustrating a graphical user interface to allow a user to initiate one or more queries and the aggregate results from such queries;

FIG. 4 is a diagram illustrating a display of additional information characterizing an item.

Like reference symbols in the various drawings indicate like elements.

DETAILED DESCRIPTION

Figure 1:
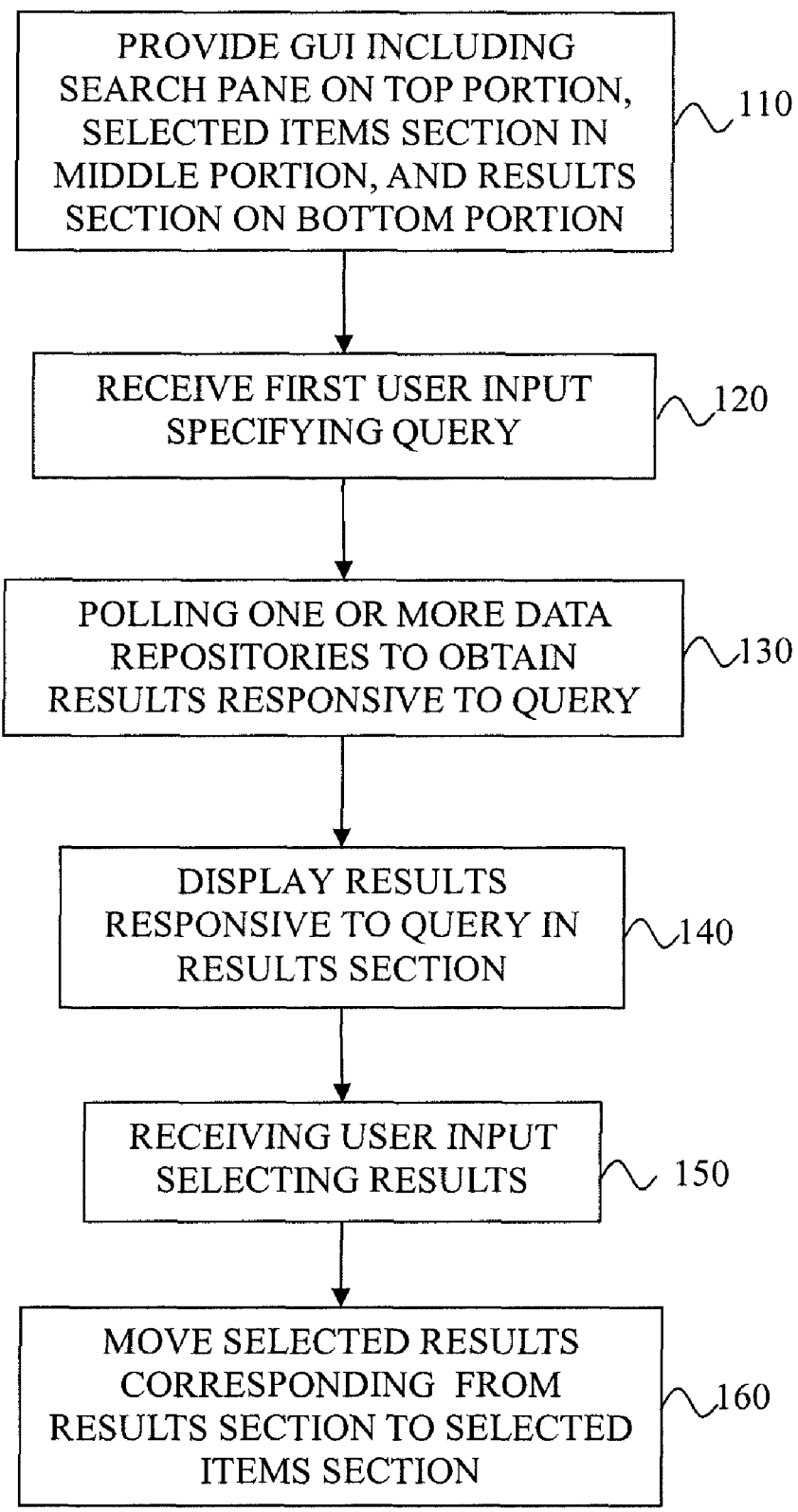
FIG. 1 is a process flow diagram illustrating a technique to allow a user to initiate one or more queries and the aggregate results from such queries.

FIG. 1 is a process flow diagram illustrating a method 100 in which, at 110, a graphical user interface including, in a single table, a search pane on a top portion, a results section on a bottom portion, and a selected items section in a middle portion between the top portion and the bottom portion is provided. Thereafter, at 120, first user-generated input is received via the search pane in the top portion of the table in the graphical user interface that specifies a first alphanumeric search query. In response, at 130, one or more data repositories are polled to obtain results responsive to the first alphanumeric search query. Once the results are obtained, at 140, one or more results responsive to the first alphanumeric search query are displayed in the results section. Each result responsive to the first alphanumeric search query is displayed in a respective row in the results section of the table. Each result responsive to the first alphanumeric search query further includes a first graphical user interface element in the corresponding row. Second user-generated input is received, at 150, that selects one or more of the first graphical user interface elements in the results section. In response to such second user-generated input, at 160, results corresponding to the selected one or more first graphical user interface elements are moved from the results section to the selected items section of the table such that results that do not correspond to the selected one or more first graphical user interface elements remain displayed in the results section.

FIG. 2 is a diagram illustrating an interface 200 to be presented on a client computer system that includes a search pane 220 in a top portion, a selected items section 240 in a middle portion, and a results section 260 in a bottom portion. The search pane includes an input box 222 by which a user can provide alphanumeric query terms to initiate a query (e.g., search) of one or more remote data repositories. The results of such query are displayed as results 262 along rows of the results section 260. The items can be characterized using various identification information along columns 248. In addition, each item can include an associated graphical user interface element 264, which when activated by the user, causes the corresponding item to be moved from the results section 260 up to the selected items section 240 as a selected item 242. Similarly, selected items 242 can include corresponding graphical user interface elements 244, which when activated, cause the associated corresponding item 242 to be moved from the selected items section 240 to the results section 260 (or optionally to be removed altogether from both the selected items section 240 and the results section 260).

Each of the selected items section 240 and the results section 260 can include a scrollbar 248, 268 which is active when the number of items in each respective section exceeds a predetermined amount. In addition, the relative size of the selected items section 240 in relation to the results section 260 can increase or decrease depending on the number of items 242 in the selected items section. In some implementations, the results section 260 remains fixed with a predetermined number of rows (regardless of the number of items being displayed within the results section 260).

In some variations, the selected items section 240 can grow dynamically depending on the number of items in the list and the scrollbar 248 becomes active when the selected items require more than 10 rows. The results section 260 has a fixed set of ten rows so that the corresponding scrollbar 268 only becomes active when the results include more then ten items 262.

The selected items section 240 can also include buttons 250 and 252 to respectively remove selected items 242 within the selected items section 240 which respectively results in either the selected items 242 or all of the selected items 242 being moved to the results section 260. Similarly, the results section 260 can include a select all button 270 which, when activated, causes all items 262 in the results section 260 to be moved up into the selected items section 240.

The selected items section 240 can also include functionality (for example, by way of a add row button 246) that allows a user to manually add an item to the selected items list. For example, the user can activate the add row button 246 so that a new empty row is added to the selected items section 240. The user can then add information in one of the columns 248 which is used to generate a query for a particular item. For example, the user could enter in the term "Burner" in the Product Description column which would cause information for a Burner to be displayed as an item 242. The letters entered into the column could cause, for example, a query of one or more data repositories to be generated to identify the closest match for such letters (and as a result, populate a row with the relevant information to identify the item).

Figure 3:
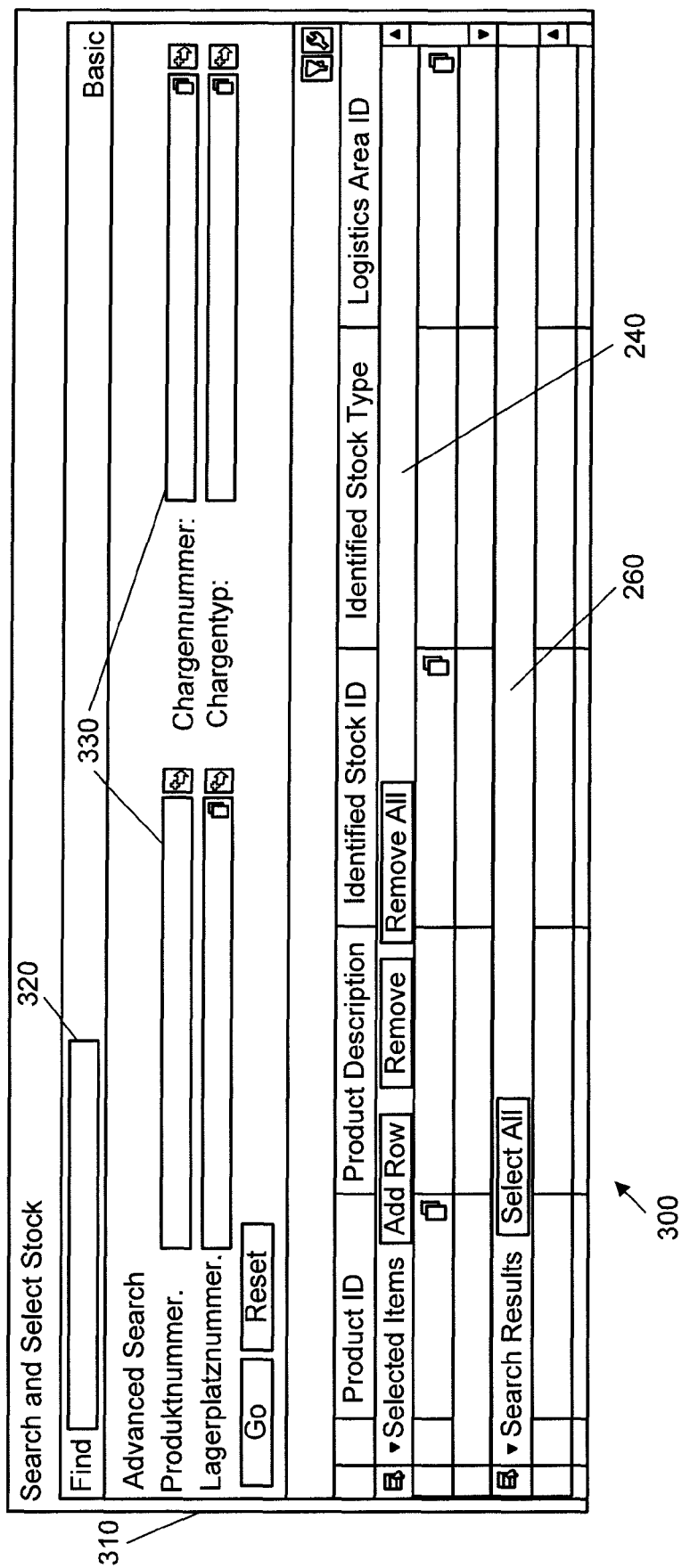
FIG. 3 is a diagram illustrating an alternative search pane.

FIG. 3 is a diagram 300 that illustrates an alternative search pane 310 in which there is an input box 320 by which a user can initiate an alphanumeric search query as well as additional input elements 330 by which a user can define parameters for the query. For example, a user may be able to enter a query in the input box 320 and further restrict such query by the input elements 330. Alternatively, the user can leave the input box 320 blank and then enter information into one of the input elements 330. For example, one of the input elements 330 might only relate to part number and so any number enter into such input element will result in a query for corresponding part numbers and the like.

Clicking on the items 242, 262 (or graphical user interface elements associated with the items) can cause additional information relating to the items to be displayed (see for example, details section 410 of the interface 400 illustrated in FIG. 4).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, while the foregoing generally relates to error messages, it can be appreciated that the current subject matter can be used in connection with any arrangement in which it is desirable to modify a message generated by a backend system for presentation to a user on a front end system. Other embodiments may be within the scope of the following claims.

What is claimed is:

1. An article comprising a non-transitory machine-readable storage medium embodying instructions that when performed by one or more machines result in operations comprising:

providing a graphical user interface including, in a single table, a search pane on a top portion, a results section on a bottom portion, and a selected items section in a middle portion between the top portion and the bottom portion;

receiving first user-generated input, via the search pane in the top portion of the table in the graphical user interface, specifying a first alphanumeric search query;

polling one or more data repositories to obtain results responsive to the first alphanumeric search query;

displaying, in the results section, one or more results responsive to the first alphanumeric search query, each result responsive to the first alphanumeric search query being displayed in a respective row in the results section of the table, each result responsive to the first alphanumeric search query further including a first graphical user interface element in the corresponding row;

receiving second user-generated input, via the graphical user interface, selecting one or more of the first graphical user interface elements in the results section;

moving, in the single table, results corresponding to the selected one or more first graphical user interface elements from the results section to the selected items section of the table, wherein results that do not correspond to the selected one or more first graphical user interface elements remain displayed in the results section;

receiving third user-generated input, via the search pane in the top portion of the table in the graphical user interface, specifying a second alphanumeric search query;

polling one or more data repositories to obtain results responsive to the second alphanumeric search query;

displaying, in the results section, one or more results responsive to the second alphanumeric search query as well as results that do not correspond to the selected one or more first graphical user interface element, each result responsive to the second alphanumeric search query being displayed in a respective row in the results section of the table, each result further responsive to the second alphanumeric search query including a second graphical user interface element in the corresponding row;

receiving fourth user-generated input selecting one or more of the second graphical user interface elements in the results section; and moving, in the single table, results corresponding to the selected one or more second graphical user interface elements from the results section to the middle portion of the table, wherein results that do not correspond to the selected one or more first graphical user interface elements and that do not correspond to the selected one or more second graphical user interface elements remain displayed in the results section.

2. An article as in claim 1, wherein the search pane further includes one or more graphical user interface elements for defining parameters of the first alphanumeric search query.

3. An article as in claim 1, wherein the graphical user interface is rendered on a client computer system and the one or more data repositories reside on one or more remote computer systems.

4. An article as in claim 1, wherein the single table is a fixed size, and wherein scrollbars are rendered in the graphical user interface when rows in either of the middle portion or the bottom portion cannot be rendered due to size restrictions.

5. An article as in claim 1, wherein the second user-generated input changes an attribute associated with records for the selected results in the one or more data repositories.

6. An article as in claim 1, wherein a size of the selected items section varies depending on the number of items contained therein.

7. A computer-implemented method comprising:
 providing a graphical user interface including, in a single table, a search pane on a top portion, a results section on a bottom portion, and a selected items section in a middle portion between the top portion and the bottom portion;
 receiving first user-generated input, via the search pane in the top portion of the table in the graphical user interface, specifying a first alphanumeric search query;
 polling one or more data repositories to obtain results responsive to the first alphanumeric search query;
 displaying, in the results section, one or more results responsive to the first alphanumeric search query, each result responsive to the first alphanumeric search query being displayed in a respective row in the results section of the table, each result responsive to the first alphanumeric search query further including a first graphical user interface element in the corresponding row;
 receiving second user-generated input, via the graphical user interface, selecting one or more of the first graphical user interface elements in the results section;
 moving, in the single table, results corresponding to the selected one or more first graphical user interface elements from the results section to the selected items section of the table, wherein results that do not correspond to the selected one or more first graphical user interface elements remain displayed in the results section;
 receiving third user-generated input, via the search pane in the top portion of the table in the graphical user interface, specifying a second alphanumeric search query;
 polling one or more data repositories to obtain results responsive to the second alphanumeric search query;
 displaying, in the results section, one or more results responsive to the second alphanumeric search query as well as results that do not correspond to the selected one or more first graphical user interface element, each result responsive to the second alphanumeric search query being displayed in a respective row in the results section of the table, each result further responsive to the second alphanumeric search query including a second graphical user interface element in the corresponding row;
 receiving fourth user-generated input selecting one or more of the second graphical user interface elements in the results section; and
 moving, in the single table, results corresponding to the selected one or more second graphical user interface elements from the results section to the middle portion of the table, wherein results that do not correspond to the selected one or more first graphical user interface elements and that do not correspond to the selected one or more second graphical user interface elements remain displayed in the results section.

8. A method as in claim 7, wherein the search pane further includes one or more graphical user interface elements for defining parameters of the first alphanumeric search query.

9. A method as in claim 7, wherein the graphical user interface is rendered on a client computer system and the one or more data repositories reside on one or more remote computer systems.

10. An article comprising a non-transitory machine-readable storage medium embodying instructions that when performed by one or more machines result in operations comprising:
 providing a graphical user interface including a search pane on a top portion, a results section on a bottom portion, and a selected items section in a middle portion between the top portion and the bottom portion;
 receiving, via the search pane in the top portion in the graphical user interface, a plurality of alphanumeric search queries;
 polling, for each query, one or more data repositories to obtain results responsive to such alphanumeric search query;
 displaying, in the results section, one or more results responsive to a most recent alphanumeric search query, each result responsive to the corresponding alphanumeric search query being displayed in a respective row in the results section, each result responsive to the first alphanumeric search query further including a graphical user interface element in the corresponding row;
 receiving, via the graphical user interface, selections of one or more of the graphical user interface elements in the results section; and
 moving results corresponding to the selected one or more graphical user interface elements from the results section to the selected items section, wherein results from the most recent alphanumeric search query that do not correspond to the selected one or more first graphical user interface elements remain displayed in the results section, wherein results from an alphanumeric search query prior to the most recently alphanumeric search query are not displayed in the results section, wherein the selected items section contains results originating from two or more alphanumeric search queries.

11. An article as in claim 10, wherein the search pane further includes one or more graphical user interface elements for defining parameters of the first alphanumeric search query.

12. An article as in claim 10, wherein the graphical user interface is rendered on a client computer system and the one or more data repositories reside on one or more remote computer systems.

13. An article as in claim 10, wherein the search pane, the results section, and the selected items section are rendered in a single table.

14. An article as in claim 13, wherein the single table is a fixed size, and wherein scrollbars are rendered in the graphical user interface when rows in either of the middle portion or the bottom portion cannot be rendered due to size restrictions.

15. An article as in claim 13, wherein the selection of results change attribute associated with records for the selected results in the one or more data repositories.

16. An article as in claim 10, wherein a size of the selected items section varies depending on the number of items contained therein.

* * * * *